United States Patent [19]
Maebara et al.

[11] Patent Number: 6,084,966
[45] Date of Patent: *Jul. 4, 2000

[54] COMMUNICATING ENCRYPTED SIGNALS IN WHICH RANDOM BITS AND RANDOM BIT POSITION DATA ARE INSERTED

[75] Inventors: Akihiro Maebara; Katsumi Kobayashi; Ichiro Okajima; Noriko Uchida; Shinji Uebayashi, all of Yokohama, Japan

[73] Assignee: NTT Mobile Communications Network, Inc., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/549,827

[22] PCT Filed: Jul. 14, 1995

[86] PCT No.: PCT/JP95/01410

§ 371 Date: Apr. 8, 1996

§ 102(e) Date: Apr. 8, 1996

[87] PCT Pub. No.: WO96/02992

PCT Pub. Date: Feb. 1, 1996

[30] Foreign Application Priority Data

Jul. 15, 1994 [JP] Japan .................... 6-164103

[51] Int. Cl.⁷ .................................. H04K 1/00
[52] U.S. Cl. ................. 380/43; 380/46; 380/49; 380/9; 380/42
[58] Field of Search ............... 380/6, 8, 28, 42, 380/43, 47, 59, 49, 9

[56] References Cited

U.S. PATENT DOCUMENTS

| | | | |
|---|---|---|---|
| 3,978,288 | 8/1976 | Bruckner et al. | 380/8 |
| 4,214,206 | 7/1980 | Everaarts | 380/9 |
| 5,148,485 | 9/1992 | Dent | 380/46 |
| 5,321,753 | 6/1994 | Gritton | 380/42 |
| 5,335,280 | 8/1994 | Vobach | 380/42 |
| 5,412,730 | 5/1995 | Jones | 380/46 |
| 5,535,239 | 7/1996 | Padovani et al. | 381/13 |
| 5,706,346 | 1/1998 | Katta et al. | 380/10 |

FOREIGN PATENT DOCUMENTS

| | | | |
|---|---|---|---|
| 0 173 647 A2 | 3/1986 | European Pat. Off. | H04L 9/00 |
| 63-248240 | 10/1988 | Japan | H04L 9/00 |
| 1-194627 | 8/1989 | Japan | H04L 9/00 |
| 1-212039 | 8/1989 | Japan | H04L 9/02 |
| 1-284037 | 11/1989 | Japan | H04L 9/02 |
| 4-101529 | 4/1992 | Japan | H04L 9/06 |

OTHER PUBLICATIONS

Bruce Schneier, "Applied Cryptology: Protocols, Algorithms, and Source Code in C", 1st edition John Wiley and Sons, N.Y. (1993) pp. 166–167.

Maurer et al., "Cascade Ciphers: The Importance of Being First", Journal of Cryptology, 1993, USA, vol. 6, No. 1, pp. 55–61.

Lai et al., "A Proposal for a New Block Encryption Standard", Advances in Cryptology—Eurocrypt '90, Workshop on the Theory and Application of Cryptographic Techniques Proceedings, Aarhus, Denmark, May 21–24, 1990, pp. 389–404.

Shimizu et al., "FEAL—Fast Data Encipherment Algorithm", Systems & Computers in Japan, vol. 19, No. 7, Jul. 1, 1998, pp. 20–33, 104–106.

*Primary Examiner*—Pinchus M. Laufer
*Attorney, Agent, or Firm*—Brinks Hofer Gilson & Lione

[57] ABSTRACT

A transmitted signal is enciphered or concealed to thereby prevent interference, even when data indicative of the receiver terminal is made public because of the use of a common access channel. In the transmitter, in a random-number bit adder 6, a random-number α (digital signal) generated by a random-number generator 5 is inserted into a transmitting data signal DA generated by a transmitting data generator 1, and the resultant is outputted as a signal (DA, α). An encipherment processor 2 enciphers the signal (DA, α) and outputs it as a signal (DA, α)'. In the receiver, this signal (DA, α)' is deciphered into (DA, α), and the random-bits are removed from (DA, α) to restore the signal DA.

11 Claims, 8 Drawing Sheets

COMMUNICATING ENCRYPTED SIGNALS IN WHICH RANDOM BITS AND RANDOM BIT POSITION DATA ARE INSERTED

BACKGROUND OF THE INVENTION

1. Field of the Invention

This invention relates to a signal transmitting method and a communication system suitable for use in a system in which a plurality of mobile stations can access a common access channel, for example.

2. Discussion of the Prior Art

In a digital signal transmission system in which a plurality of terminals can access a common channel, it is necessary to use identification data to identify a transmitter terminal and its communication counterpart for the following reason. If the transmitter and receiver terminals are unknown, the signal itself becomes impossible to transmit because the common channel can be accessed by many terminals. The same is true when a packet communication is performed in a mobile telephone.

Under the above-mentioned circumstance, it is customarily known that a certain signal is to be transmitted from a known transmitter terminal to a known receiver terminal. Therefore, identification data indicative of the receiver terminal (or mobile station) can easily be intercepted or monitored. For this reason, intentional interference can easily be performed when so desired. For example, some kind of signal can readily be sent to the counterpart terminal for the purpose of interference.

As a preventative measure, a signal can be made secret or concealed. For the sake of convenience in the communication system, however, it is practically impossible to make secret or conceal data of the receiver station and therefore, it is only data of the transmitting signal that can be made secret.

FIG. 16 illustrates one example of a construction for enciphering a signal having a transmitting data generator 1 for generating data to be transmitted. Data DA prepared in the transmitting data generator 1 is enciphered by an encipherment processor 2 in accordance with a given algorithm. For encipherment, a key Key is used. For decoding the enciphered signal, the receiver may use the same key as the transmitter side.

In that case, since the transmitter and the receiver are asynchronous, the receiver cannot appropriately change the key Key but is required to use a predetermined fixed key.

In the exemplary construction in FIG. 16, the signal can be made secret if so desired. However, when the data are simple, the original data can, in some cases, be guessed simply by seeing the enciphered result. Therefore, the exemplary construction does not have sufficient concealability to prevent interference.

In the case of control signals for a mobile communication, for example, the data are limited and the kinds of data are also small, only three in some cases. On the other hand, if the signal is enciphered using a fixed key in accordance with the same algorithm, the original signal can easily be derived because the kind of enciphered signal becomes the same in number as the original signal. That is, with the method for enciphering a signal using the same key, when the kind of patterns of the signal is small, the pattern of the enciphered result also becomes small. Thus, the original signal can easily be derived.

For the reasons mentioned above, when a signal should be monitored by a third party who has a good knowledge of the system, there is a large possibility that the transmitted or received signal can be guessed as to what the signal is, based on data obtained from the monitored result, such as the frequency of occurrence of a certain pattern, signal length, etc., which are the results of encipherment. Especially, when the signal in question is a control signal, the purpose of the control signal can be guessed (for example, connection, disconnection, and the like).

Once a third party knows that a signal is transmitted for a given purpose, the third party can generate a signal identical to the one which the genuine terminal generates without knowing the key for concealment. As a consequence, it becomes possible for the third party to interfere with the communication pretending to be the genuine terminal.

In case, for example, of a packet communication using a mobile telephone in which the number of different control signals is small, a simple encipherment is not a sufficient preventive measure of possible interference for the reasons mentioned above. In addition, since a signal is transmitted in a communication system which is easily monitored, an effective preventive measure against possible interference is required.

SUMMARY OF THE INVENTION

The present invention has been developed in view of the above-background. It is, therefore, an object of the present invention to provide a signal method and a communication system in which a communication can be fully protected from being interfered with by a third party, by providing means for concealing a transmitting signal itself even in the case where data indicative of a receiver terminal are obliged to be revealed because of the use of a common access channel.

In order to solve the above problems, the invention is characterized in that the transmitter inserts a random-number bit into a predetermined position of a signal to be transmitted, enciphers the signal using a predetermined key, and then transmits the enciphered signal, and the receiver decodes the encipherment of a received signal using the predetermined key and then removes the random-number bit from the predetermined position of the signal.

The invention is further characterized in that the transmitter inserts a random-number bit and identification data for identifying a local station on the transmitter side into a predetermined position of a signal to be transmitted, enciphers the signal using a predetermined key, and then transmits the enciphered signal. The receiver decodes the encipherment of a received signal using the predetermined key, removes the random-number bit from a predetermined position of the signal which has been deciphered, judges whether or not the identification data is in agreement with identification data of a device on the transmitter, and judges that the signal has been received in a normal condition when the first judgement is affirmative.

The invention is further characterized in that a transmitting device comprises a random-number generating means for generating a random-number of a predetermined bit, transmitting signal generating means for outputting a signal to be transmitted, random-number inserting means for inserting the random-number bit, which has been generated by the random-number generating means, into a predetermined position of the signal outputted by the transmitting signal generating means, and then outputting the signal, and enciphering means for enciphering the output signal of the random-number inserting means, using a predetermined key.

A receiving device comprises decipherment means for deciphering a received signal using the predetermined key, and random-number bit removing means for removing the random-number bit from a predetermined position of the signal outputted by the decipherment means.

The invention is further characterized in that a transmitting device comprises a random-number generating means for generating a random-number of predetermined bits, transmitting signal generating means for outputting a signal to be transmitted, bit adding means for inserting a random-number generated by the random-number generating means, and identification data bits for identifying to the transmitting device predetermined positions of the signal outputted by the transmitting signal generating means, and then outputting the same, and enciphering means for enciphering the output signal of the bit adding means, using a predetermined key. A receiving device comprises deciphering means for deciphering a received signal using the predetermined key, random-number bit removing means for removing the random-number from a predetermined position of the output signal of the deciphering means, and judging means for judging whether or not the identification data included in the output signal of the deciphering means is in agreement with the identification data of the transmitting device, and judging that the received signal is effective when the first judgment result is affirmative.

The invention is further characterized in that the transmitter side generates random-number position data indicative of a position for adding a random-number and adds the random-number to a bit position corresponding to the random-number position data. The receiver side generates random-number position data having the same value as the transmitter side in the same sequential order as the transmitter side, and removes the random-number from a bit position corresponding to the generated random-number position data.

The invention is further characterized in that the transmitting device comprises first random-number position data generating means for generating random-number position data indicative of a position to which a random-number is to be added, the random-number adding means inserts the random-number at a position corresponding to the random-number position data generated by the first random-number position data generating means. The receiving device comprises second random-number position data generating means for generating position data having the same value as the position data generated by the first random-number position data generating means in the same sequential order, the random-number removing means removing a random-number from a bit position corresponding to the random-number position data generated by the second random-number position data generating means.

The invention is further characterized in that the transmitter side generates random-number position data indicative of a position to which a random-number is to be added, adds a random-number to a bit position corresponding to the random-number position data, and adds the random-number position data to the transmitting signal. The receiver side extracts random-number position data from a received signal, and removes a random-number from a bit position corresponding to the random-number position data thus extracted.

The invention is further characterized in that the transmitting device comprises random-number position data generating means for generating random-number position data indicative of a position to which a random-number is to be added, and random-number position signal adding means for inserting the random-number position data into the transmitting signal, the random-number adding means for adding the random-number to a position corresponding to random-number position data generated by the random-number position data generating means. The receiving device comprises random-number position data extracting means for extracting random-number position data from the received signal, the random-number bit removing means removing a random-number from a bit position corresponding to random-number position data extracted by the random-number position data extracting means.

The invention is further characterized in that the transmitter side adds random-number position data for a signal to be transmitted next to the signal transmitted immediately therebefore, and the receiver side removes a random-number from a signal to be received next, based on random-number position data extracted from the signal received immediately therebefore.

The invention is further characterized in that the random-number adding means of the transmitting device adds random-number position data of a signal to be transmitted next to a signal to be transmitted immediately therebefore, and the random-number bit removing means of the receiving device removes a random-number from a signal to be received next, based on random-number position data extracted, by the random-number position data extracting means, from a signal received immediately therebefore.

(Operation)

Pursuant to the invention, random-number bits are added to predetermined positions of a signal to be transmitted and enciphered using a predetermined key. Accordingly, the original signal cannot be restored merely by breaking the enciphered signal. On the other hand, removal of the random-number bits from predetermined positions of deciphered signal makes it possible to restore the original signal. In that case, since the signal is enciphered by being applied or added with a random-number, plural results of encipherment can be obtained with respect to a single signal. The above-mentioned problem can be obviated. That is, while it is very difficult for a third party to interfere, it is easy for both the transmitter side and the receiver side to make secret or conceal the data. In this case, although an address to be added to the transmitting signal is not made secret or concealed, interference can be prevented because the third party cannot restore the enciphered signal portion to the original state even when the transmitting signal is successfully monitored by the third party.

Pursuant to the invention, the transmitter side enciphers a signal to be transmitted, together with identification data combined therewith and the receiver side restores it, so that a judgment can be made as to whether identification data in the received signal is in accord with the identification data of the transmitting device. Based on the judgement result, it can be determined whether or not the received signal is a genuine one. For example, since the concealing key has a fixed length, patterns applicable to the key are limited (as one example, in case the concealing key has eight (8) bytes, the patterns applicable to the key are $2^{64}$). Thus, there is a possibility that a terminal or terminals exist in which a communication is performed using the same key in the same time zone. Therefore, by applying identification data for identifying a certain terminal from others, the arrangement prevents a signal from a terminal, which uses the same key, being received by mistake.

Pursuant to the invention, the position where a random-number is inserted can be shifted at random. Further, the receiver side can favorably restore the signal by having the same random-number inserting position data as the transmitter side. Furthermore, by shifting the position of the random-number, the pattern which occurs when the signal is enciphered can be varied. Accordingly, a large number of patterns can be generated with small kinds of random-numbers. As a consequence, the number of patterns to be generated can be increased extensively even if the number of the random-number bits are the same. This makes it very difficult for a third party to guess the content of a signal. In contrast, when the number of patterns to be generated is arranged to be the same, the number of the random-number bits can be small, thus obtaining the same result with a small data amount.

Pursuant to the invention, the position of a random-number can be known based upon random-number position data contained in the received signal. On the other hand, the random-number adding position data can be preliminary fixedly by both the transmitter side and the receiver side, and the random-number position cannot be derived from the received signal. Accordingly, there is a risk that the resultant following signal cannot be received, if disagreement occurs in the random-number adding position between the transmitter side and the receiver side when the signal is annihilated or the like. In contrast, in an arrangement in which the transmitting signal contains random-number adding position data, even if a signal is annihilated, the following signal can be received in a normal condition.

A-1: Construction Of First Embodiment

Figure 1:
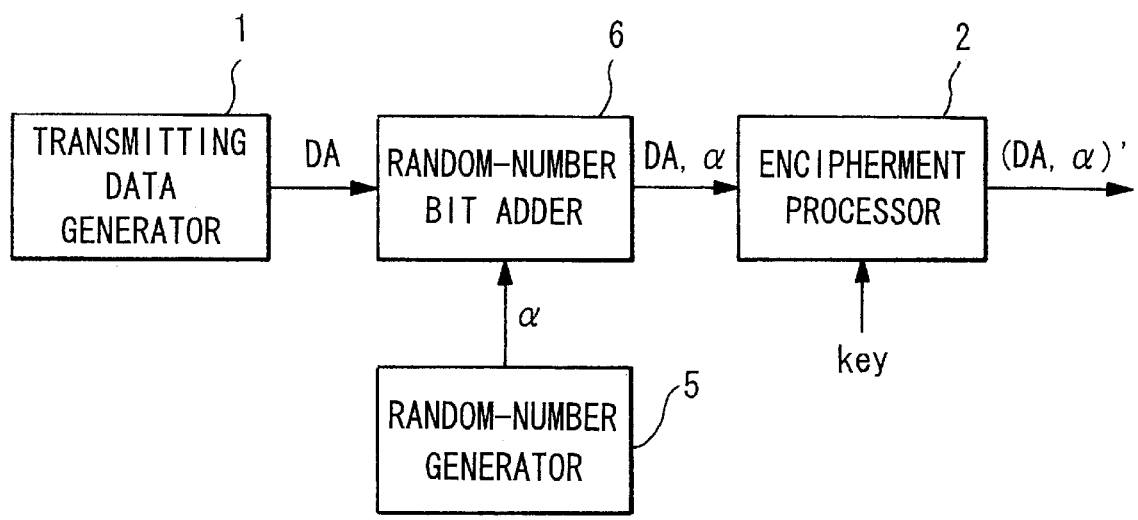
FIG. 1 is a block diagram showing a construction of a transmitting device according to a first embodiment of the present invention.
Figure 16:
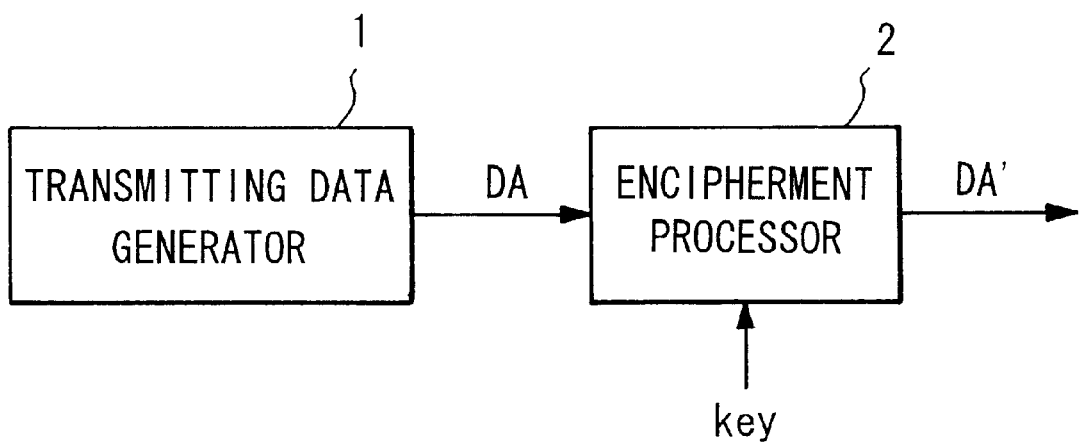
FIG. 16 is a block diagram showing a general exemplary construction in which transmitting data is enciphered.

A transmitting device in a first embodiment of the present invention is described with reference to FIG. 1, which illustrates a transmitting data generator 1 for generating a signal to be transmitted, and an encipherment processor 2 for making an encipherment, these being the same as shown in FIG. 16. A random-number generator 5 generates a random-number (digital signal) which is added to a signal DA in a random-number bit adder 6. In this case, the random-number is generated in a preliminarily determined bit number.

Figure 3:
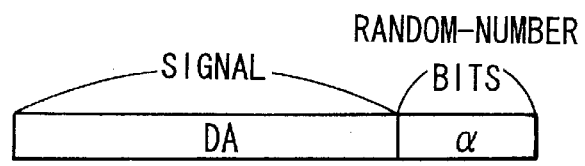
FIG. 3 is a representation showing a construction of a data of an output signal in a random-number bit adder.

In the random-number bit adder 6, as shown in FIG. 3, bits of the random-number are inserted into the signal DA and outputted as a signal (DA, $\alpha$). Then, in the encipherment processor 2, the signal (DA, $\alpha$) is enciphered and outputted as a signal (DA, $\alpha$)'.

Figure 2:
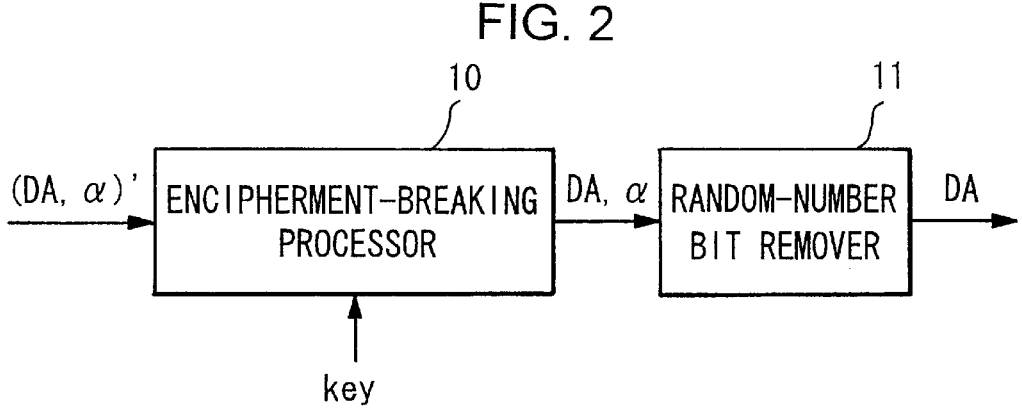
FIG. 2 is a block diagram showing a construction of a receiving device according to the first embodiment.

FIG. 2 is a block diagram showing a construction of a receiving device of this embodiment. An encipherment-breaking (deciphering) processor 10 decodes or breaks the encipherment of the signal (DA, $\alpha$)', using a predetermined key Key. The encipherment-breaking processor 10 outputs a signal (DA, $\alpha$), and a random-number bit remover 11 removes the random-number bits from the signal (DA, $\alpha$) and transmits it in the form of a signal DA alone to a circuit of a later stage.

A-2: Operation of First Embodiment

According to the above-mentioned construction, the transmitting device outputs a signal obtained by enciphering the signal DA by inserting the random-number. Accordingly, even in the case where the signal DA is small, the signal outputted by the transmitting device is substantially increased in accordance with the bit number of the random-number.

In this case, since the enciphered signal is changed in various ways in accordance with the random-number without any change in algorithm for encipherment and in its key Key, the signal DA cannot be derived from (DA, $\alpha$)'. Thus, concealability of signal is greatly enhanced.

On the other hand, in the receiving device, the signal (DA, $\alpha$)' deciphered in the encipherment-breaking processor 10 using the fixed key Key and then, the random-number bits are removed in the random-number bit remover 11 to reproduce the signal DA.

In the above-mentioned procedure, if the algorithm for encipherment, key Key, bit number of the random-number $\alpha$, and insert positions of the random-number bits are preliminarily decided and known by the transmitting device and the receiving device, then the signal DA generated by the transmitting device can be assuredly be reproduced in the receiving device.

Figure 4:
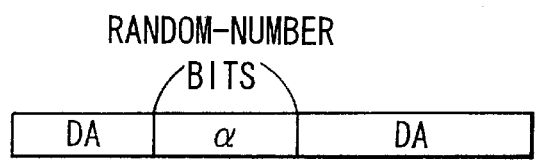
FIG. 4 is a representation showing a second construction of a data of the output signal in a random-number bit adder.

It should be noted that although the bits of the random-number are inserted into positions after the signal DA in the example shown in FIG. 3, the inserting positions of the random-number are not limited to this, and may be a starting part of the signal DA, or it may be inserted into an intermediate part of the signal DA as shown in FIG. 4. What is essential is that as long as the bit positions are known, the signal DA can easily be reproduced by the receiving device.

Figure 5:
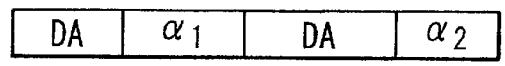
FIG. 5 is a representation showing another construction of a data of the output signal in the random-number bit adder.

Furthermore, the random-number bits may be divided into $\alpha$ 1 and $\alpha$ 2 and then inserted into the signal DA as shown in FIG. 5.

A-3: Modification of First Embodiment

Figure 6:
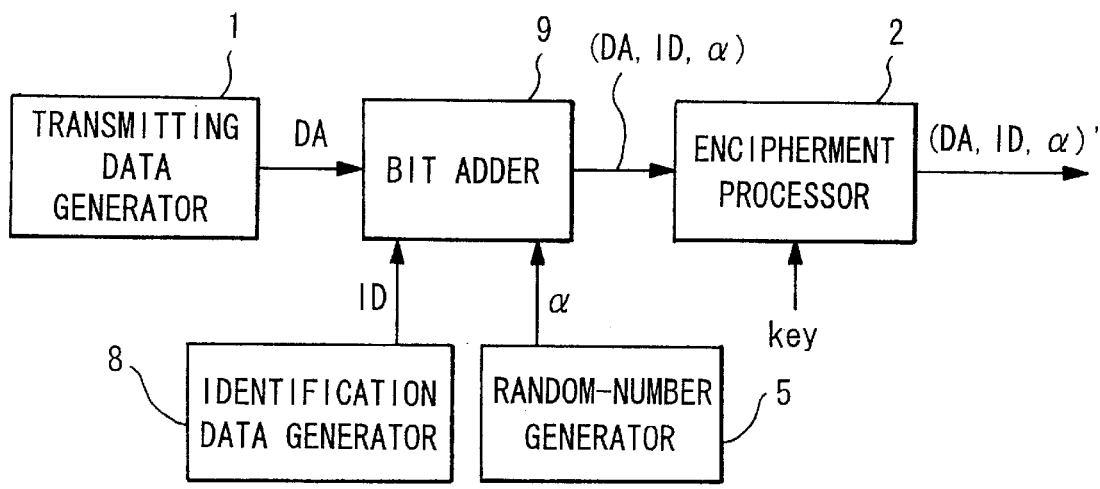
FIG. 6 is a block diagram showing a second construction of a transmitting device according to a modification of the first embodiment of the present invention.
Figure 7:
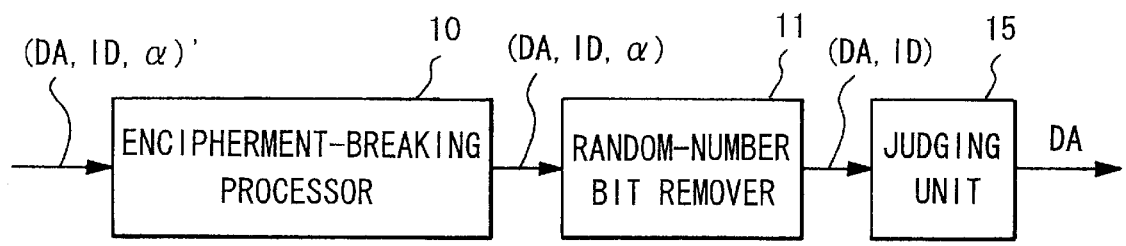
FIG. 7 is a block diagram showing a construction of a receiving device according to a modification of the first embodiment.
Figure 8:
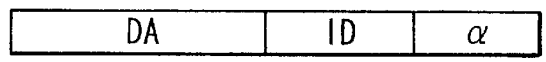
FIG. 8 is a representation showing a construction of a data of an output signal in a bit adder.

Next, a modification of the above-mentioned embodiment will be described with reference to FIGS. 6 to 8. As shown in FIG. 6, identification data ID for identifying the specific device are generated in the identification data generator 8, and the identification data ID and random-number α are added to the signal DA in the bit adder 9 (see FIG. 8). As a consequence, the signal output from the encipherment processor 2 becomes (DA, ID, α).

In the receiving device, a judging unit 15 makes the following judgment with respect to the signal (DA, ID) outputted from the random-number bit remover 11. The judging unit 15 reads the identification data ID contained in the signal (DA, ID) and judges whether or not the identification data ID thus read are in agreement with the identification data of the transmitting device. The ID of the transmitting device is preliminarily recognized by means of a prior communication, or is preliminarily registered through a setting operation with respect to a device to be subjected to communication.

When an agreement of the identification data is detected in the judging unit 15, a judgment is made to the effect that a normal receiving is performed, and the signal DA contained in the received signal is transmitted, as regular data, to a later stage. On the other hand, when an agreement of the identification data is not detected in the judging unit 15, the specific received-signal is invalidated.

In this modification, the signal is concealed using a random number and in addition, agreement of identification data between the transmitter side and the receiver side is judged. Thus, this modification is extremely effective against interference.

In case a packet communication is performed in the above modification, the identification data ID contained in the enciphered signal may be compared with data for identifying a device, which data are usually included in a part of the header of the packet. In this case, the unconcealed identification data included in the header can easily be monitored from outside. However, the identification data ID contained in the enciphered signal are not known. Accordingly, any interference attempt to transmit a signal resembling the header portion would be unsuccessful because the received signal is invalidated in the judging unit 15.

B: Second Embodiment

Figure 9:
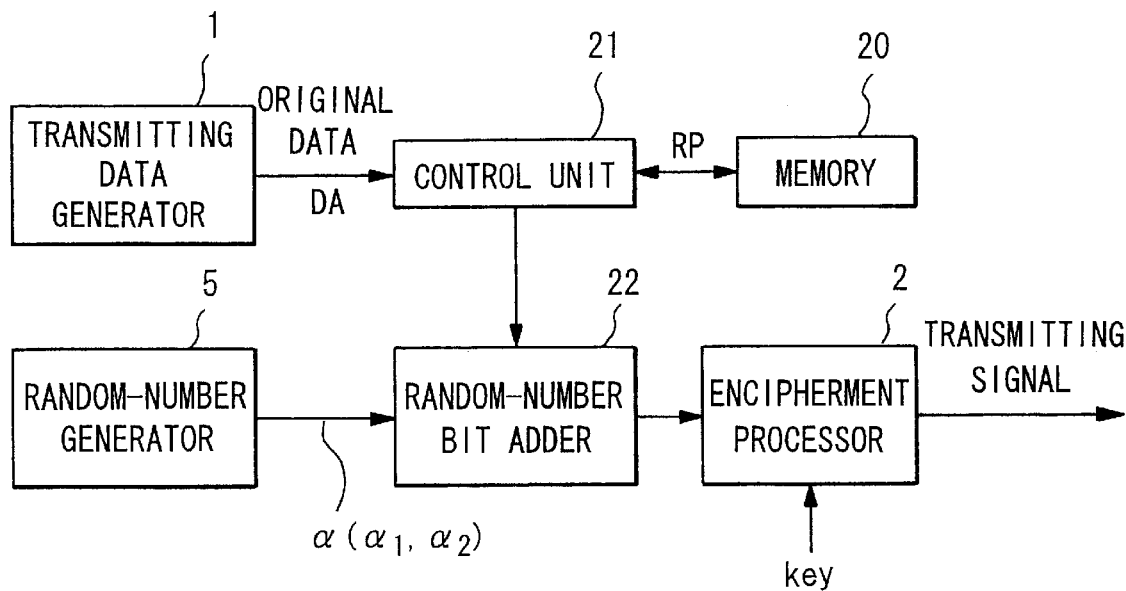
FIG. 9 is a block diagram showing a construction of a transmitting device according to a second embodiment of the present invention.
Figure 10:
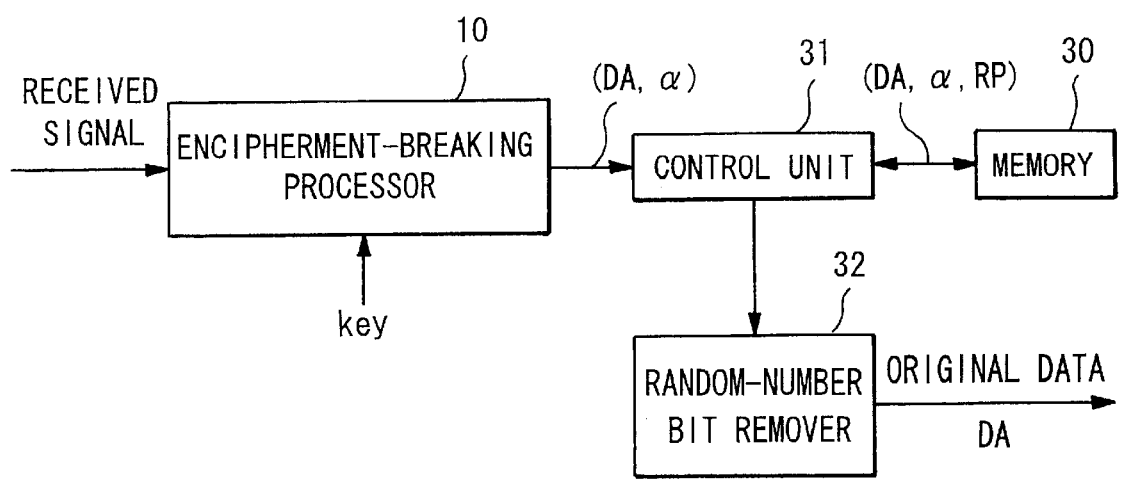
FIG. 10 is a block diagram showing a construction of a receiving device according to a second embodiment.

A second embodiment of the present invention will now be described with reference to FIGS. 9 and 10. FIG. 9 depicts a construction of the transmitter side, whereas FIG. 10 depicts a construction of the receiver side. In the illustrations, like parts of the first embodiment are denoted by like reference numerals.

Figure 11A:
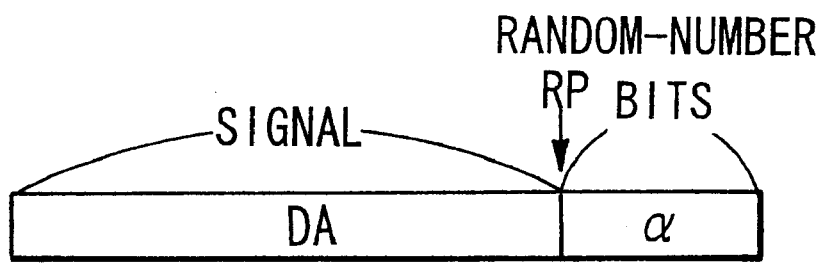
FIG. 11A is a representation for explaining the functions of random-number position data RP.
Figure 11B:
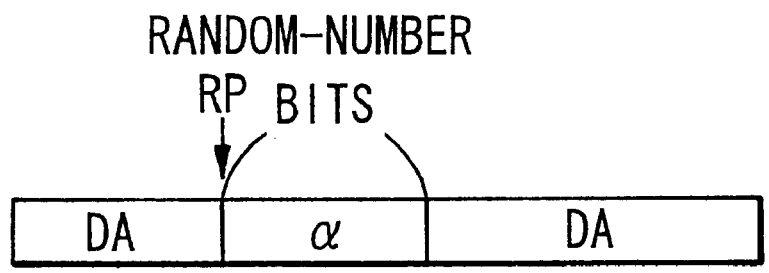
FIG. 11B is a second representation for explaining the functions of random-number position data RP.
Figure 11C:
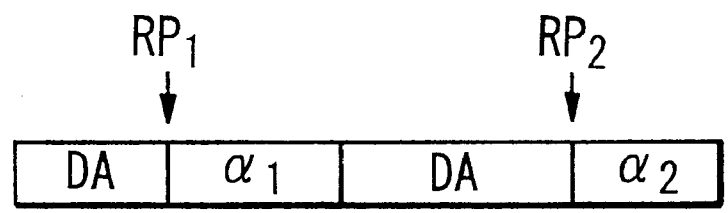
FIG. 11C is a third representation for explaining the functions of random number position data RP.

Reference numeral 20 of FIG. 9 denotes a memory in which a plurality of random-number position data RP indicative of random-number bits insert positions are stored. In this case, the random-number α is inserted, as shown in FIGS. 11A and 11B, in the bit positions indicated by the random-number position data RP. In case the random-number is divided into α 1 and α 2 as in the above-mentioned modification, corresponding random-number position data as prepared (see random-number position data RP1, RP2, of FIG. 11C).

A control unit 21 of FIG. 9 adds random-number position data RP, which are read from memory 20, to a signal DA (original data) which is outputted by a transmitting data generator 1 and transmits the same to a random-number bit adder 22. The random-number bit adder 22 inserts a random-number α into the signal DA in the bit position indicated by the random-number position data RP. The random-number α-added signal (DA, α) is enciphered by an encipherment processor 2 and then outputted as a signal (DA, α)'.

In memory 30 shown in FIG. 10, a plurality of random-number position data RP are stored as in the case of memory 20. In this case, the stored content of the memory 20 is strictly coincident with that of the memory 30. The control unit 31 adds the random-number position data RP (or RP1, RP2) read from the memory 20 to the signal (DA, α) enciphered by the encipherment-breaking (deciphering) processor 10 and transmits the same to a random-number bit remover 32. At this time, the sequential order of the random-number position data read from the memory 20 is the same as the reading sequential order of the control unit 21 on the transmitter side. Therefore, the random-number position data RP read from the memory 30 serve as data indicative of the insert position of the random-number α in the received signal (DA, α). The random-number bit remover 32 removes the random-number a from the signal (DA, α) based on the content of the random-number position data RP and outputs the signal DA (original data).

As discussed above, since the random-number insert position is appropriately shifted in this embodiment, concealability of a signal is greatly enhanced.

It should be noted that although the random-number insert position is shifted based upon the random-number position data RP prestored in the memory in this embodiment, it may be shifted based upon time data, etc. What is essential here is that the random-number positions recognized between the transmitter side and the receiver side are synchronous.

C: Third Embodiment

Next, a third embodiment will be described with reference to FIG. 12 and 13. Corresponding parts of the illustrations to those of the respective embodiments mentioned above are denoted by identical reference numerals and descriptions thereof are omitted.

Figure 12:
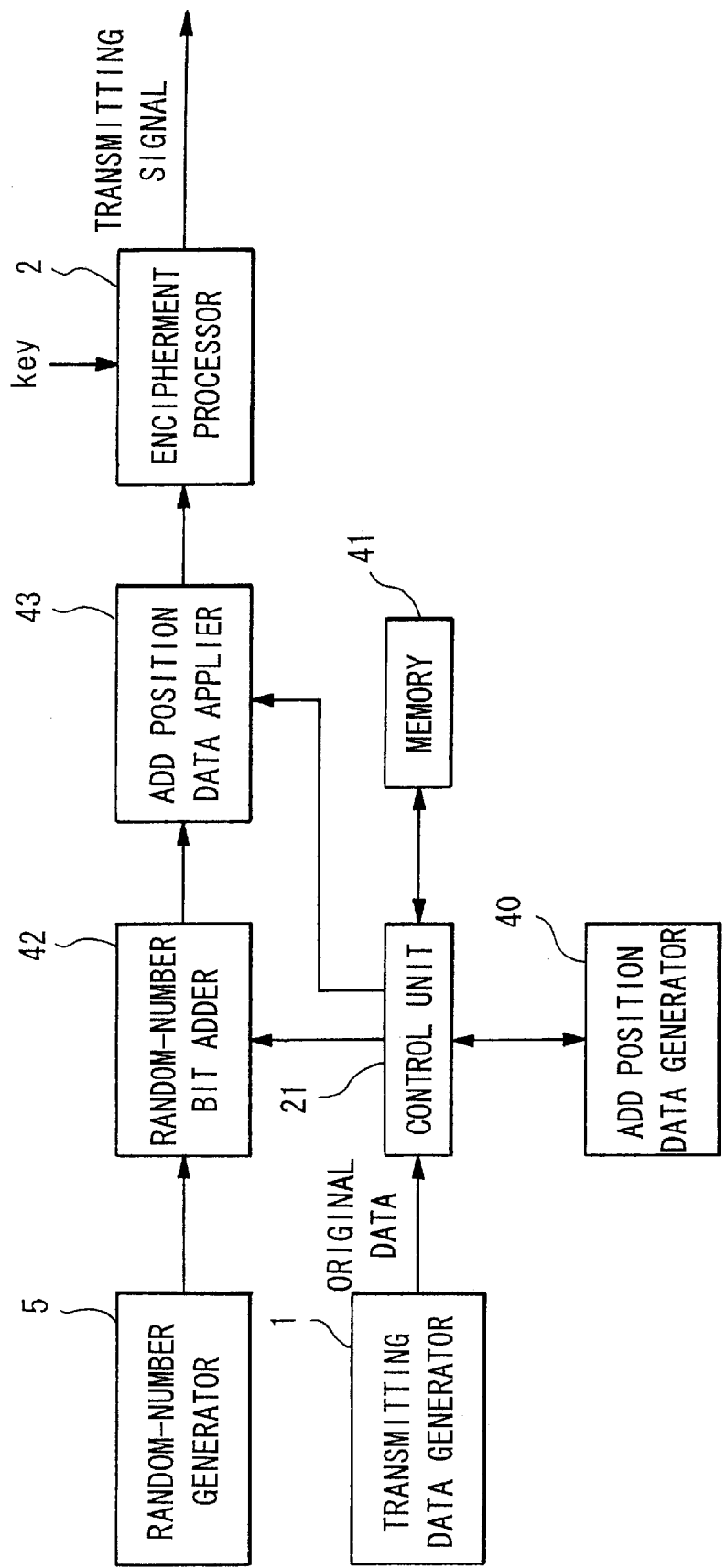
FIG. 12 is a block diagram showing an exemplary construction of a transmitting device according to a third embodiment of the present invention.

An add position data generator 40 of FIG. 12 generates random-number position data RP indicating an adding position for a random-number α. The random-number position data RP of this case are a random value or a variable value derived in accordance with a predetermined rule. Also, an initial value of the random-number position data RP is stored in the memory 41. When supplied with the signal DA (original data) from the transmitting data generator 1, the control unit 21 transmits the same to a random-number bit adder 42 and an add position data applier 43, together with the random-number position data RP read from the memory 41, and substitutes the random-number position data RP newly prepared by the add position data generator 40 in the memory 41.

As in the second embodiment, the random-number bit adder 42 inserts a random-number α in a corresponding position into the random-number position data RP in the signal DA to prepare a signal (DA, α) and outputs the same. The add position data applier 43 applies the random-number position data RP to a predetermined position of the signal (DA, α) and outputs the same as a signal (DA, α, RP). This signal is enciphered by the encipherment processor 2 and transmitted to the receiver side of FIG. 13 as a signal (DA, α, RP).

Figure 13:
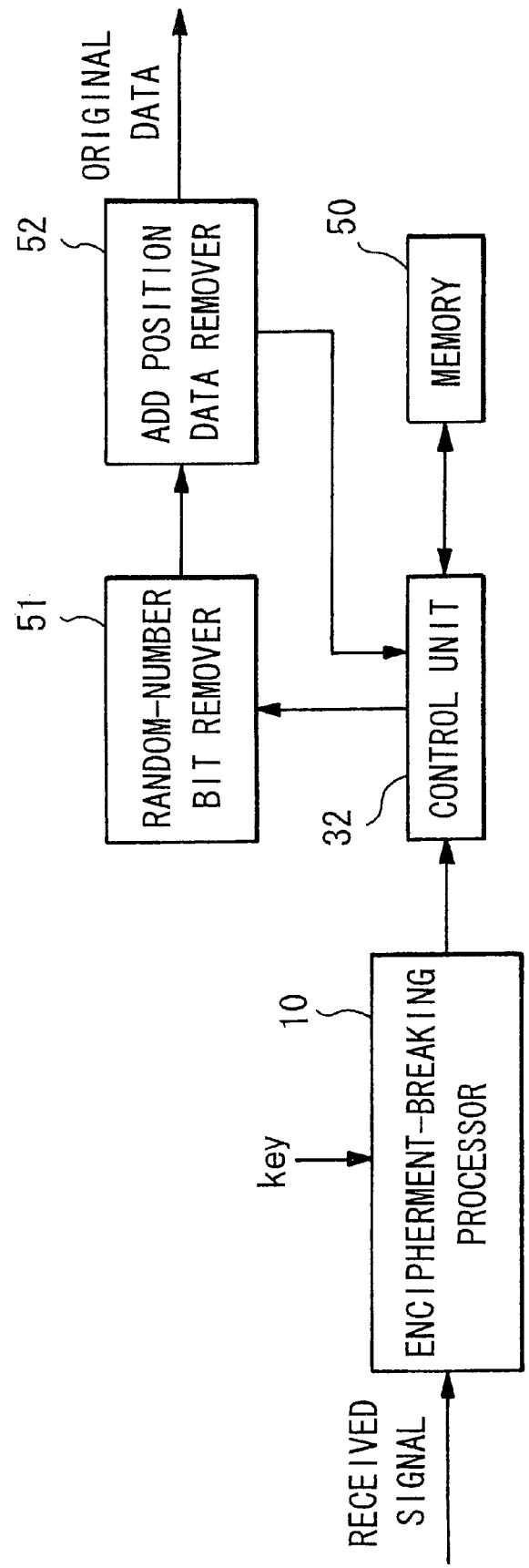
FIG. 13 is a block diagram showing an exemplary construction of a receiving device according to a third embodiment.

An initial values of a random-number position data RP is stored in a memory 50 of FIG. 13. This value is the same to that in the memory 41. When supplied with a signal (DA, α, RP) from an encipherment-breaking processor 10, a control unit 32 transmits the same to a random-number bit remover 51 together with the random-number position data RP read from the memory 50. In the random-number 51, as in the case with the aforementioned embodiment, the random-number α is removed with reference to the random-number position data RP to prepare a signal (DA, RP) and the signal (DA, RP) is transmitted to an add position data remover 52. In the add position data remover 52, the random-number position data RP are discriminated from the signal (DA, RP0 to restore the signal DA. At the same time, the discriminated random-number position date RP are transmitted to the control unit 32. Also, the random-number position data RP transmitted to the control unit 32 are written for renewal in the memory 50.

As described above, the random-number position data RP corresponding to the next signal are added to the preceding signal and transmitted on the transmitter side, whereas the random-number α is removed from a newly received signal using the random-number position data RP added to the preceding signal on the receiver side. Accordingly, the random-number position data RP is used on the transmitter side are always coincident with the random-number position data RP used on the receiver side.

In the above description, the random-number position data RP of the next transmitting signal are added to the preceding transmitting signal. In the alternative, the random-number position data RP used for the current transmitting signal may be added directly to the current transmitting signal. It should be noted, however, that concealability of the signal is greater in the case of the above-mentioned embodiment.

D: Others (1) Re: Random-Number

As the random-number in the above-mentioned respective embodiments, those generated by a known random-number generator may be used. It is also acceptable that a random-number table be stored in a memory and a random-number be generated by appropriately reading this random table.

Also, a numeric value, which cannot be defined as a random-number in a strict sense, may be used. For example, time information outputted by a timer and output values of a counter for sequentially counting a given clock may be used.

(2) Re: Encipherment

Various algorithms may be used for encipherment. The encipherment is classified roughly into two: secret key method and open key method. This classification is made based upon the manner of use of an encipherment key. Any of the two may be applied to the present invention.

In the case of the secret key method, it is required that both the transmitter side and the receiver side preliminarily have the same key. This method enables a high-speed operation and is, therefore, practical. The key in this secret key method may be preliminary fixedly stored on both the transmitter side and the receiver side or the key may be delivered at the start of a communication.

A known encipherment algorithm for the secret key method is the Fast Data Encipherment Algorithm, discussed in detail on pages 43 to 49 of "Encipherment and Data Security" (co-written by Shigeo Tsujii and Masao Kasahara: issued by Shokodo).

(3) Example of Construction of Random-Number Bit Adder

Figure 14:
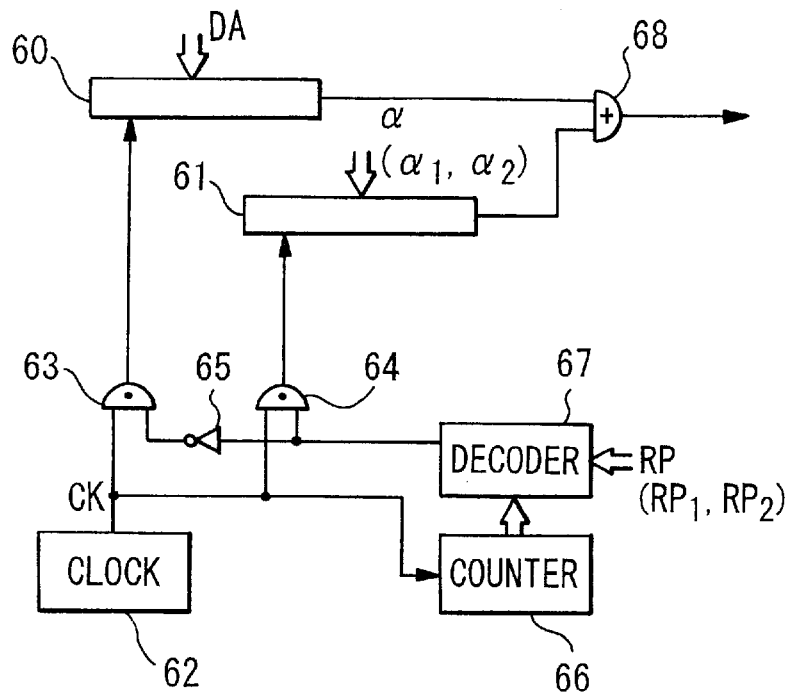
FIG. 14 is a block diagram showing an exemplary construction of a random-number bit adder.

One example of a construction of the random-number bit adders 6, 22 and 42 of the above-mentioned respective embodiments is depicted in FIG. 14, in which a signal DA and a random-number α are transmitted to shift registers 60 and 61, respectively. Based upon clock signals CK supplied from a clock generator 62 respectively through AND gates 63 and 64, the shift registers 60 and 61 shift the signal DA and the random-number α by a bit each time and output the same. A counter 66 is adapted to cyclically count the clock CK, and the counting cycle corresponds to a combined length of the signal DA and random-number α (or α 1, α 2). A decoder 67 decodes the value counted by the counter 66, and outputs a signal "1" from a count value corresponding to the random-number position data RP (or RP1, RP2) to a count value corresponding to the random-number α (or α 1, α 2), and outputs a signal "0" in other count values. The output signal of the decoder 67 are supplied to an AND gate 64 and also to an AND gate 63 through an inverter 65.

According to the above-mentioned construction, the output signal of the decoder 67 is "0" in all other positions than the bit position of the random-number α designated by the random-number position data RP. As a consequence, the AND gate 63 is opened, the AND gate 64 is closed, and the shift register 60 alone performs the shifting operation. Consequently, the signal DA in the shift register 60 is outputted through an OR gate 68. On the other hand, the output signal of the decoder 67 is "1" in the bit position of the random-number α (or α 1, 2) designated by the random-number position data RP (or RP1, RP2). As a consequence, the AND gate 63 is closed, the AND gete 64 is brought open, and the shift register 61 alone performs the shifting operation. Consequently, the random-number α (or α 1, α 2) is outputted from the OR gate 68. In this way, a signal having the random-number is applied to a predetermined position of the signal DA is prepared.

The aforementioned bit adder 9 adds not only the random-number but also the identification data ID. The adding portion of the random-number can be realized with the above-mentioned circuit construction.

It should be noted that the above-mentioned circuit is only an example and other circuit constructions may be employed. Also, the same purpose may be realized by software processing.

(4) Constitutional Example of Random-Number Bit Remover

Figure 15:
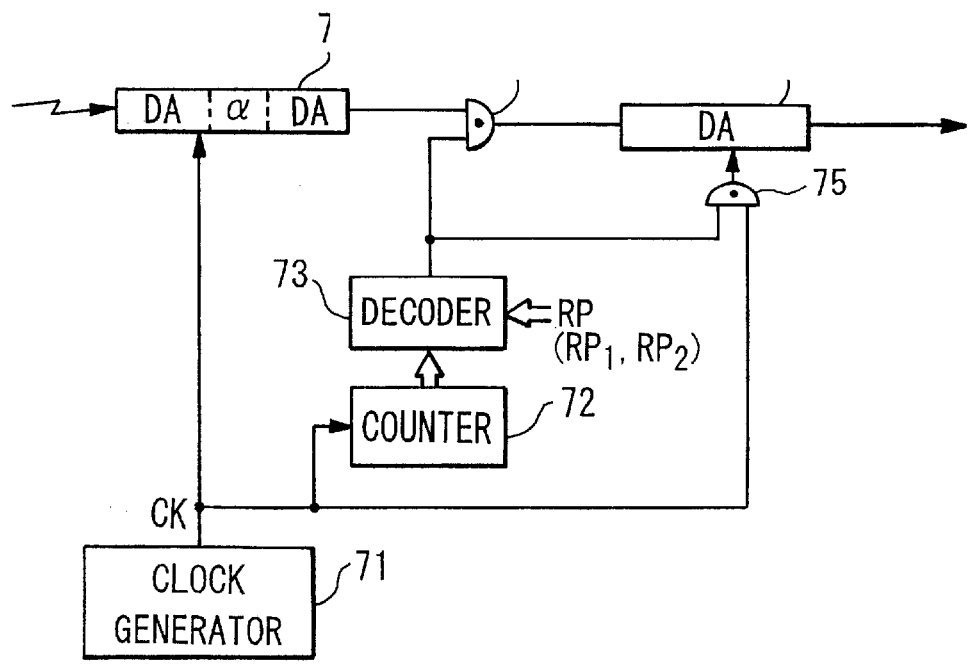
FIG. 15 is a block diagram showing an exemplary construction of a random-number bit remover.

FIG. 15 is a block diagram showing one example of a construction of the random-number bit remover 11, 22, 32, 51. In this circuit, data of a combination of the signal DA and random-number are transmitted to a shift register 70. A clock signal CK outputted from a clock generator 71 is transmitted to the shift register 70, a counter 72, and an AND gate 75. The counter 72 is adapted to cyclically count the clock CK, and the count cycle corresponds to the combined length of the signal DA and the random-number α (or α 1, α 2). The decoder 73 decodes the count value of the counter 72, and outputs a signal "0" from the count value corresponding to the random-number position data RP (or RP1, RP2) to the random-number α (or α 1, α 2), and outputs a signal "1" for other count values. The output signals of the decoder 73 are supplied to the AND gates 74 and 75.

According to the above-mentioned construction, signals (DA, α) are outputted, one after another, from the shift register 70 in synchronism with the clock signal CK. Since the output signal of the decoder 73 is "1" in other positions than the bit position of the random-number α designated by the random-number position data RP, the AND gate 75 is opened and shift register 76 performs the shifting operation. Since the AND gate 74 is also open at this time, the data output, one after another, from the shift register 70 are transmitted, one after another, to the shift register 76 through the AND gate 74.

On the other hand, the output signal of the decoder 73 is "0" in the bit position of the random-number α designated by the random-number position data RP. As a consequence, the AND gates 74 and 75 are closed and the shift register 70 alone performs the shifting operation. Consequently, the random-number α (or α 1, α 2) outputted from the shift register 70 does not pass through the AND gate 74 and is discarded. Since the shift register 76 does not perform the shifting operation at this time, no input side empty bit is generated. When bit positions other than the random-number α come, the AND gates 74 and 75 are opened again and the shift register 76 starts the shifting operation. As a consequence, the signal DA is transmitted to the shift register 76. By means of the aforementioned operation, only the signal DA is extracted in the shift register 76.

It should be noted that the above-mentioned circuit is only one example and other circuit constructions may be employed. Also, the same purpose may be realized by means of software processing.

E: Effect

As described in the foregoing, in the above-mentioned respective embodiments, a signal is added with a random-number and then enciphered. Accordingly, encipherment of a single signal results in the generation of a plurality of designs. By this, for example, even in the case where data are obliged to be open because a common access channel is used, the transmitting signal itself can favorably be concealed and interference can be fully prevented from occurring.

The invention is suited to be used when a plurality of mobile stations access a common access channel, for example. The invention can also be used for communications in which concealment is necessary. It can also be applied when a packet communication is performed in a mobile communication system.

We claim:

1. A signal transmitting and receiving method, comprising:

in the transmitter side, the steps of:

generating preparatory transmission data by inserting a random-number position data into a predetermined position of a signal to be transmitted, the random-number position data indicating a random-number bit position in the preparatory transmission data, and by inserting random-number bits into bit positions designated by the random-number position data;

generating transmission data by enciphering the preparatory transmission data using a predetermined key; and transmitting the transmission data; and in the receiver side, the steps of:

generating preparatory receive data by deciphering the transmission data using the predetermined key;

extracting the random-number position data from the preparatory receive data; and removing the random-number bits using the random number position data extracted from the preparatory receive data.

2. A communication system, comprising:

a transmitter, including:

a random-number generator;

a preparatory transmission data generator coupled to the random number generator, the preparatory transmission data generator inserting a random number position data into a predetermined position of a signal to be transmitted, and inserting random number bits into bit positions corresponding to the random number position data; and an enciphering unit coupled to the preparatory transmission data generator, the enciphering unit generating transmission data by enciphering the preparatory transmission data using a predetermined key; and a receiver, including:

a deciphering unit, the deciphering unit generating preparatory receive data by deciphering the transmission data using the predetermined key;

a random-number position data extractor coupled to the deciphering unit, the random-number position data extractor extracting the random-number position data from the preparatory receive data; and a random-number remover coupled to the random number position data extractor, the random-number remover removing the random-number bits from positions corresponding to the extracted random number position data.

3. A transmitting device, comprising:

a random-number generator;

preparatory transmission data generator coupled to the random-number generator, generating preparatory transmission data by inserting a random number position data into a predetermined position of a signal to be transmitted and by inserting random-number bits into bit positions corresponding to the random-number position data; and an enciphering unit coupled to the preparatory transmission number generator, generating transmission data by enciphering the preparatory transmission data using a predetermined key.

4. A receiving device for receiving transmission data generated by enciphering preparatory transmission data using a predetermined key comprising:

a deciphering unit, the deciphering unit generating preparatory receive data by deciphering the transmission data using the predetermined key;

a random-number position data extractor coupled to the deciphering unit, the random-number position data extractor extracting the position data from the preparatory receive data; and a random-number remover coupled to the random-number position data extractor, the random number remover removing the random-number bits from positions corresponding to the extracted random-number position data.

5. A signal transmitting and receiving method, comprising:

in the transmitter side, the steps of:

generating preparatory transmission data corresponding to a first signal to be transmitted and a second signal to be transmitted after the first signal by inserting random-number position data into a predetermined position of the first signal, the random-number position data indicating a random-number bit position in the second signal, and inserting random-number bits into bit positions in the second signal designated by the random-number position data in the preparatory transmission data corresponding to the first signal;

generating transmission data by enciphering the preparatory transmission data using a predetermined key; and transmitting the transmission data; and in the receiver side, the steps of:

generating preparatory receive data by deciphering the transmission data using the predetermined key;

extracting the random-number position data from the preparatory receive data corresponding to the first signal; and removing the random-number bits from the preparatory receive data corresponding to the second signal using the random-number position data extracted from the preparatory receive data corresponding to the first signal.

6. A communication system, comprising:

a transmitter, including:

a random-number generator;

a preparatory transmission data generator coupled to the random-number generator, the preparatory transmission data generator generating preparatory transmission data by:

inserting random-number position data into a predetermined position of a first signal to be transmitted, and inserting random-number bits into bit positions of a second signal corresponding to the random-number position data of the first signal, the second signal to be transmitted after the first signal; and an enciphering unit coupled to the preparatory transmission data generator, the enciphering unit generating transmission data by enciphering the preparatory transmission data using a predetermined key; and a receiver, including:

a deciphering unit, the deciphering unit generating preparatory receive data by deciphering the transmission data using the predetermined key;

a random-number position data extractor coupled to the deciphering unit, the random-number position data extractor extracting the random-number position data from the preparatory receive data corresponding to the first signal; and a random-number remover coupled to the random-number position data extractor, the random-number remover removing the random-number bits from positions in the preparatory receive data corresponding to the second signal, the positions corresponding to the extracted random-number position data in the preparatory receive data corresponding to the first signal.

7. The communication system according to claim 6, wherein:

the preparatory transmission data generator includes an adder, the adder inserting the random-number position data into the first signal; and the random-number remover includes a subtractor, the subtractor removing the random-number bits from preparatory receive data corresponding to the second signal.

8. A transmitting device, comprising:

a random-number generator;

a preparatory transmission data generator coupled to the random-number generator, the preparatory transmission data generator generating preparatory transmission data by:

inserting random-number position data into a predetermined position of a first signal to be transmitted, and inserting random-number bits into bit positions of a second signal corresponding to the random-number position data of the first signal, the second signal to be transmitted after the first signal; and an enciphering unit coupled to the preparatory transmission data generator, the enciphering unit generating transmission data by enciphering the preparatory transmission data using a predetermined key.

9. The transmitting device according to claim 8, wherein:

the preparatory transmission data generator includes an adder, the adder inserting the random-number position data into the first signal.

10. A receiving device for receiving transmission data generated by enciphering preparatory transmission data using a predetermined key, the preparatory transmission data corresponding to a first signal and to a second signal, the second signal to be transmitted after the first signal, the receiving device comprising:

a deciphering unit, the deciphering unit generating preparatory receive data by deciphering the transmission data using the predetermined key;

a random-number position data extractor coupled to the deciphering unit, the random-number position data extractor extracting the random-number position data from the preparatory receive data corresponding to the first signal; and a random-number remover coupled to the random-number position data extractor, the random-number remover removing the random-number bits from positions in the preparatory receive data corresponding to the second signal, the positions corresponding to the extracted random-number position data in the preparatory receive data corresponding to the first signal.

11. The receiving device according to claim 10, wherein:

the random-number remover includes a subtractor, the subtractor removing the random-number bits from preparatory receive data corresponding to the second signal.

\* \* \* \* \*